United States Patent
Gou et al.

(10) Patent No.: US 11,381,345 B2
(45) Date of Patent: Jul. 5, 2022

(54) DATA FEEDBACK, SENDING AND RECEIVING METHOD AND DEVICE, RECEIVING EQUIPMENT AND SENDING EQUIPMENT

(71) Applicant: ZTE CORPORATION, Guangdong (CN)

(72) Inventors: Wei Gou, Guangdong (CN); Peng Hao, Guangdong (CN); Feng Bi, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 221 days.

(21) Appl. No.: 16/645,036

(22) PCT Filed: Aug. 13, 2018

(86) PCT No.: PCT/CN2018/100293
§ 371 (c)(1),
(2) Date: Mar. 6, 2020

(87) PCT Pub. No.: WO2019/047676
PCT Pub. Date: Mar. 14, 2019

(65) Prior Publication Data
US 2020/0266931 A1   Aug. 20, 2020

(51) Int. Cl.
*H04L 1/18* (2006.01)
*H04L 5/00* (2006.01)
*H04L 27/26* (2006.01)
*H04W 72/04* (2009.01)

(52) U.S. Cl.
CPC .......... *H04L 1/1812* (2013.01); *H04L 5/0055* (2013.01); *H04L 27/2607* (2013.01); *H04W 72/042* (2013.01)

(58) Field of Classification Search
CPC . H04L 1/1812; H04L 5/0055; H04L 27/2607; H04W 72/042
See application file for complete search history.

(56) References Cited

U.S. PATENT DOCUMENTS

| | | | |
|---|---|---|---|
| 2016/0374090 A1 | 12/2016 | Kim et al. | |
| 2018/0006791 A1* | 1/2018 | Marinier | H04W 52/0216 |
| 2018/0167931 A1* | 6/2018 | Papasakellariou | H04L 5/0094 |
| 2018/0278368 A1* | 9/2018 | Kim | H04L 1/1829 |

(Continued)

FOREIGN PATENT DOCUMENTS

| | | |
|---|---|---|
| CN | 106888074 A | 6/2017 |
| CN | 106961319 A | 7/2017 |

(Continued)

OTHER PUBLICATIONS

"Discussion on UL HARQ-ACK feedback for CBG-based retransmission" 3GPP TSG RAN WG1 Meeting #90—Prague, Czech Republic, Aug. 21-25, 2017—R1-1714395—5 pages.

(Continued)

*Primary Examiner* — Duc C Ho
(74) *Attorney, Agent, or Firm* — KDB Firm PLLC (57) ABSTRACT

Disclosed are a data feedback, sending and receiving method and device, a receiving device and a sending device. The data feedback method includes generating a hybrid automatic repeat request acknowledgement (HARQ-ACK) for transmitted data; and feeding back the HARQ-ACK to a sending end.

18 Claims, 3 Drawing Sheets

Generate HARQ-ACK for transmitted data — S102

Feed back the HARQ-ACK to a sending end — S104

(56) References Cited

U.S. PATENT DOCUMENTS

| | | | |
|---|---|---|---|
| 2019/0215128 A1* | 7/2019 | Zhang | H04L 5/001 |
| 2021/0120537 A1* | 4/2021 | Lei | H04L 5/0053 |

FOREIGN PATENT DOCUMENTS

| | | | |
|---|---|---|---|
| CN | 107113096 A | | 8/2017 |
| CN | 111277390 A | | 6/2020 |
| WO | 2016108666 A1 | | 7/2016 |
| WO | 2016161629 A1 | | 10/2016 |

OTHER PUBLICATIONS

European Search Report and Written Opinion for the European Patent Application No. EP18852974, mailed Apr. 6, 2021, 9 pages.

Office Action for Chinese Patent Application No. 201710807037.9, dated Dec. 25, 2020, 8 pages.

Search Report for Chinese Patent Application No. 2017108070379, dated Dec. 25, 2020, 1 page.

ZTE, "UL control for CBG" 3GPP Draft; R1-1710019 UL Control for CBG, 3rd Generation Partnership Project, Mobile Competence Centre; 650, Route Des Lucioles; F06921 Sophia-Anti polis Cedex; France, vol. RAN WG1, No. Qingdao, P.R. China; Jun. 17, 2017.

NTT DOCOMO, Inc. "CBG based (re)transmission, preemption indication and subsequent transmission in NR" 3GPP TSG RAN WG1 Meeting #89, Hangzhou, P R. China May 15-19, 2017—R1-1708384, 8 pages.

ZTE., "UL control for CBG" 3GPP TSG RAN WG1 Meeting #90—Prague, Czech Republic, Aug. 21-25, 2017—R1-1712667, 6 pages.

NTT DOCOMO, Inc. "HARQ-ACK multiplexing" 3GPP TSG RAN WG1 Meeting #90—Prague, Czech Republic, Aug. 21-25, 2017—R1-1713957, 5 pages.

Office Action for the Japanese Patent Application No. 2020-513502, dated Apr. 22, 2021, 4 pages.

Huawei, HiSilicon., "Discussion on CBG-based feedback" 3GPP TSG RAN W1 Meeting #90—Prague, Czech Republic, Aug. 21-25, 2017, R1-1712202, 4 pages.

Intel Corporation., "CBG-base (re)transmissions: HARQ-ACK feedback" 3GPP TSG-RAN WG1 #90—Prague, Czechia Aug. 21-25, 2017—R1-1712595, 4 pages.

Office Action for the Korean Patent Application No. 10-2020-7010106, dated May 3, 2021, 6 pages.

Office Action for the Indian Patent Application No. 202027015337, dated May 10, 2021, 5 pages.

International Search Report for the International Patent Application No. PCT/CN2018/100293, dated Oct. 26, 2018, 2 pages.

* cited by examiner

DATA FEEDBACK, SENDING AND RECEIVING METHOD AND DEVICE, RECEIVING EQUIPMENT AND SENDING EQUIPMENT

CROSS-REFERENCES TO RELATED APPLICATIONS

This is a U.S. National Stage Application, filed under 35 U.S.C. 371, of International Patent Application No. PCT/CN2018/100293, filed on Aug. 13, 2018, which claims priority to Chinese patent application No. 201710807037.9 filed on Sep. 08, 2017, contents of both of which are incorporated herein by reference in their entireties.

TECHNICAL FIELD

The present disclosure relates to, but is not limited to, the field of communications.

BACKGROUND

In a new generation mobile communication system (New Radio, NR), a new coding-decoding mode is discussed and is likely to be introduced. In this mode, a receiving end is allowed to perform decoding according to received orthogonal frequency division multiplexing (OFDM) symbols, that is, one OFDM symbol is decoded when one OFDM symbol is received, and the mode is a 'pipeline' decoding mode. The mode is mainly used for the receiving end to quickly feed back confirmation information to a sending end after receiving the last OFDM symbol data transmitted this time, and obviously, the 'pipeline' decoding mode achieves the purpose of quickly feeding back the confirmation information.

However, for the preceding decoding mode, some better acknowledgement information feedback should also be studied so that the receiving end feeds back which part of data is error as accurately as possible, rather than feeding back a piece of acknowledgement information for a transport block (TB) now, and if an error has occurred, it is not clear the error is in which specified part of data. In this way, the sending end can only send the entire TB once again. At present, a feedback method based on a code blocks group (CBG) can solve the preceding problem, that is, one TB is used for feeding back confirmation information according to multiple CBGs respectively. However, it also brings new problems, such as the overhead of acknowledgement information fed back based on the CBGs is relatively large, and in most cases each of the CBGs is correctly decoded, so only in a few cases, feedback retransmission based on the CBGs is actually used. It also means that in most cases, the determination information fed back based on the CBGs does not improve retransmission efficiency and brings large overhead. For example, if 8 CBGs are configured to feedback confirmation information, at least 8 bits of confirmation information need to be sent each time.

In the NR, when the feedback of CBG hybrid automatic repeat request (HARQ)-acknowledgements (ACKs) of multiple TBs/physical downlink shared channels (PDSCHs) at the same receiving end is multiplexed together for feedback, the overhead of the CBG HARQ-ACK is huge. For example, when the receiving end is configured with carrier aggregation (CA), and the CBG HARQ-ACK corresponding to the TBs on each carrier are fed back in a physical uplink control channel (PUCCH) of a certain slot of a carrier, the overhead of the CBG HARQ-ACK is too large and the power consumption at the receiving end is increased. Multiple TBs here, whether the TBs in different slots from one carrier or the TBs in slots from different aggregated carriers, are configured to feed back the CBG HARQ-ACK in a PUCCH. For example, each TB is configure with fed-back CBG HARQ-ACK of 10 bits, corresponding to a TB being divided into 10 CBGs, each CBG having HARQ-ACK of one bit. Then the number of feedback bits for 10 TBs will be 100 bit. Although the number of HARQ-ACK bits currently supported in the NR may be large, such as several hundred bits, how to reduce overhead and power consumption at the receiving end in the process of achieving a same function and purpose needs to be solved urgently.

No effective solution has yet been proposed for the preceding problem in the related art.

SUMMARY

Embodiments of the present disclosure provide a data feedback, sending and receiving method and device, receiving equipment and sending equipment.

According to one embodiment of the present disclosure, a data feedback method is provided. The method applied to receiving equipment includes the steps described below. A HARQ-ACK is generated for transmitted data; and the HARQ-ACK is fed back to a sending end.

According to one embodiment of the present disclosure, a data sending method is provided. The method is applied to a data sending device and includes the steps described below. Transmitted data is sent to a receiving end; and fed-back HARQ-ACK formed by the receiving end for the transmitted data according to an agreed rule is received.

According to one embodiment of the present disclosure, another data feedback method is provided. The method is applied to a receiving device and includes the steps described below. At least one of the following specified information used for feeding back HARQ-ACK is determined: PUCCH format information or PUCCH resource information; and a sending end is informed of the specified information through a demodulation reference signal (DMRS) of the PUCCH.

According to one embodiment of the present disclosure, a data receiving method is provided. The method is applied to a data sending device and includes the step described below. Specified information which is informed through a DMRS of a PUCCH is received, where the specified information is used for feeding back HARQ-ACK, and the specified information includes at least one of: PUCCH format information or PUCCH resource information.

According to another embodiment of the present disclosure, a data feedback device is provided. The device includes a generation module, which is configured to generate a HARQ-ACK for transmitted data; and a feedback module, which is configured to feed back the HARQ-ACK to a sending end.

According to another embodiment of the present disclosure, a data sending device is provided. The device includes a sending module, which is configured to send transmitted data to a receiving end; and a receiving device, which is configured to receive fed-back HARQ-ACK formed by the receiving end for the transmitted data according to an agreed rule.

According to another embodiment of the present disclosure, another data feedback device is provided. The device includes a determination module, which is configured to determine at least one of the following specified information used for feeding back HARQ-ACK: PUCCH format information or PUCCH resource information; an informing module, which is configured to inform a sending end of the specified information through a DMRS of a PUCCH.

According to another embodiment of the present disclosure, a data receiving device is provided. The device includes a receiving module, which is configured to receive specified information which is informed through a DMRS of a PUCCH, where the specified information is used for feeding back HARQ-ACK, and the specified information includes at least one of: PUCCH format information or PUCCH resource information.

According to another embodiment of the present disclosure, a receiving device is provided. The device includes a processor and a memory storing instructions executable by the processor. When executed by the processor, the instructions perform the preceding method related to the receiving device.

According to another embodiment of the present disclosure, a data sending device is provided. The device includes a processor and a memory storing instructions executable by the processor. When executed by the processor, the instructions perform the preceding method related to the sending device.

According to another embodiment of the present disclosure, a storage medium is further provided. The storage medium is configured to store the method performed by the receiving device or the method related to the data sending device.

Through embodiments of the present disclosure, the technical problem that the overhead and power consumption are large when data feedback is performed in the related art is solved, the feedback efficiency is improved, and the overhead and power consumption are reduced.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure. In the drawings.

DETAILED DESCRIPTION

The present disclosure will be described hereinafter in detail with reference to the drawings and in conjunction with embodiments. It is to be noted that if not in collision, the embodiments and features therein in the present application can be combined with each other.

It is to be noted that the terms "first", "second" and the like in the description, claims and above drawings of the present disclosure are used to distinguish between similar objects and are not necessarily used to describe a particular order or sequence.

Embodiment One

In the present embodiment, a sending end is a node that sends data and receives HARQ-ACK fed back by a receiving end for the data. A receiving end is a node that receives the data and feeds back the HARQ-ACK corresponding to the data. The data interacted between the sending end and the receiving end is transmitted data.

Figure 1:
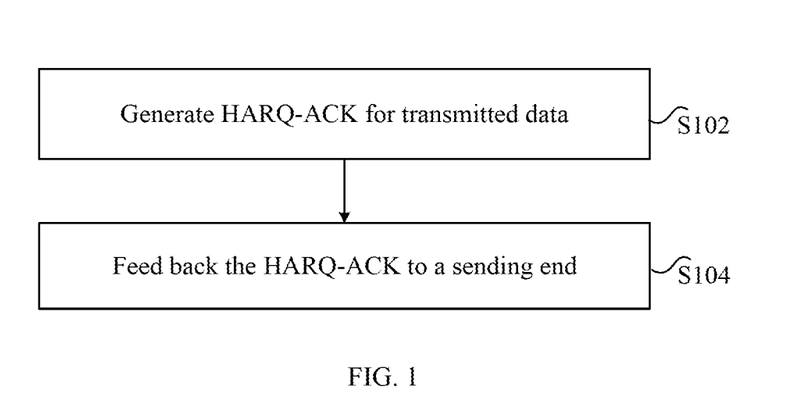
FIG. 1 is a flowchart of a data feedback method according to embodiments of the present disclosure.

The present embodiment provides a data feedback method. FIG. 1 is a flowchart of a data feedback method according to embodiments of the present disclosure. As shown in FIG. 1, the method includes the steps described below.

In step S102, a HARQ-ACK is generated for transmitted data.

In step S104, the HARQ-ACK is fed back to a sending end.

Through the preceding steps, the technical problem in the related art that the overhead and power consumption are large when data feedback is performed is solved, the feedback efficiency is improved, and the overhead and power consumption are reduced.

In one embodiment, the execution subject of the above preceding steps is a receiving end, which may be a base station, a terminal, or the like, but is not limited thereto.

In one embodiment, transmitted data refers to one or multiple TBs.

In one embodiment, the step in which HARQ-ACK is generated for transmitted data includes at least one of the following steps. A first HARQ-ACK of the TB level is generated for the transmitted data respectively, where each of TB corresponds to one bit. For incorrectly decoded TBs in the transmitted data, a second HARQ-ACK of the CBG level is generated for each incorrectly decoded TB, where each CBG corresponds to one bit.

In one embodiment, the step in which HARQ-ACK is fed back to a sending end includes one of the following steps. The first HARQ-ACK and second HARQ-ACK are fed back on two long PUCCHs respectively. The first HARQ-ACK and the second HARQ-ACK are fed back on two short PUCCHs respectively. The first HARQ-ACK is fed back on a long PUCCH and the second HARQ-ACK is fed back on a short PUCCH. The second HARQ-ACK is fed back on a long PUCCH channel and the first HARQ-ACK is fed back on a short PUCCH. Feedback is performed on different PUCCHs in at least one slot.

In one embodiment, the step in which HARQ-ACK is fed back to a sending end includes the step described below. If first HARQ-ACK and second HARQ-ACK need to be fed back at the same time, the HARQ-ACK is fed back to the sending end through one of the following modes: time division multiplexing, frequency division multiplexing and code division multiplexing.

In one embodiment, the step in which for incorrectly decoded TBs in the transmitted data, a second HARQ-ACK of the CBG level is generated for the incorrectly decoded TB includes the step described below. The second HARQ-ACK is sequentially generated for each TB of the negative acknowledgement (NACK) according to an order of the transmitted data.

In one embodiment, each TB of the NACK includes at least one of the following: the TB whose downlink control information (DCI) is not detected, and a TB which is supposed to be scheduled by a sending end but has not been sent. For example, it is planed that the sending end schedules 8 TBs, but finally the sending end sends 6 TBs, and at this time, 2 TBs are the TBs which are supposed to be scheduled but have not been sent.

In an embodiment, TBs of transmitted data satisfy at least one of the following conditions.

A number of bits of the second HARQ-ACK of the TB of NACK in the transmitted data is configured by high-layer signaling or physical-layer signaling.

A number of CBGs of the TB of the NACK in the transmitted data is configured by high-layer signaling or physical-layer signaling.

A total number of the CBGs for all TBs in the transmitted data or a total number of bits of the second HARQ-ACK for all TBs in the transmitted data are configured by a high layer, and it is agreed that a difference value of the number of the CBGs obtained by each TB or the number of bits of the second HARQ-ACKs obtained by each TB is not greater than 1.

In one embodiment, the step in which HARQ-ACK is fed back to a sending end include one of the steps described below.

When all cyclic redundancy checks (CRCs) of transmitted data pass, the HARQ-ACK only includes first HARQ-ACKs and all the first HARQ-ACKs are ACKs.

When all CRCs of code blocks (CBs) in the transmitted data pass and all the CRCs of the transmitted data do not pass, the HARQ-ACK only include first HARQ-ACKs and all the first HARQ-ACKs are NACKs.

When all CRCs of the CBs in the transmitted data do not pass and all the CRCs of the transmitted data do not pass, the HARQ-ACK only include first HARQ-ACKs and all the first HARQ-ACKs are NACKs.

When all the CRCs of the transmitted data do not pass and not all the CRCs of the CBs in the transmitted data pass or all the CRCs of the CBs in the transmitted data do not pass, the HARQ-ACK only include second HARQ-ACK.

In one embodiment, the step in which HARQ-ACK is fed back to a sending end includes the step described below. The first HARQ-ACK and second HARQ-ACK are serially connected in a same PUCCH and fed back to the sending end.

In one embodiment, transmitted data satisfies at least one of the following conditions.

The transmitted data comes from different slots of a same carrier.

The transmitted data comes from different carriers that are aggregated.

In one embodiment, the present embodiment further includes one of the steps described below. PUCCH format information and/or PUCCH resource information used for feeding back HARQ-ACK are/is determined, and the sending end is informed of the PUCCH format information and/or PUCCH resource information through a DMRS of the PUCCH. The PUCCH format information and/or the PUCCH resource information are/is obtained from the DCI corresponding to transmitted data, and the PUCCH format information and/or the PUCCH resource information are/is used for feeding back the HARQ-ACK.

In one embodiment, the step in which the sending end is informed through a DMRS of a PUCCH includes one of the steps described below.

The sending end is implicitly informed through different symbol positions of a DMRS.

The sending end is implicitly informed through different cyclic shifts of DMRS sequences.

The sending end is implicitly informed through the different DMRS sequences.

The sending end is implicitly informed through a combination of different symbol numbers and symbol positions of the DMRS.

The sending end is implicitly informed through a combination of the different cyclic shifts of the DMRS sequences in different symbols of the DMRS.

The sending end is implicitly informed through a combination of different sequences in the different symbols of the DMRS.

In one embodiment, the present embodiment further includes that PUCCH format information and/or PUCCH resource information informed through a DMRS are/is used for first HARQ-ACK and/or second HARQ-ACK according a convention with the sending end.

In one embodiment, PUCCH format information includes one of the following: a short format, a long format, a number of symbols of the PUCCH, and a specified format in a format set configured by a sending end.

In one embodiment, PUCCH resource information includes specified PUCCH resource in a PUCCH resource set configured by the sending end.

In one embodiment, PUCCH resource in a PUCCH resource set is bound with at least one of the following: a PUCCH format, a number of OFDM symbols of the PUCCH, a symbol position of the OFDM of the PUCCH, or a slot position corresponding to the PUCCH.

In one embodiment, the step in which HARQ-ACK is fed back to the sending end includes the step described below. The first HARQ-ACK and second HARQ-ACK are respectively fed back to the sending end by using adjacent first resource and second resource.

In one embodiment, the second resource is reserved according to a number of scheduled TBs and a preset transmission error probability.

In one embodiment, transmitted data includes a scheduled TB. The scheduled TB includes at least one of the following: a received TB, or a TB that has been sent by the sending end but has not been received.

Figure 2:
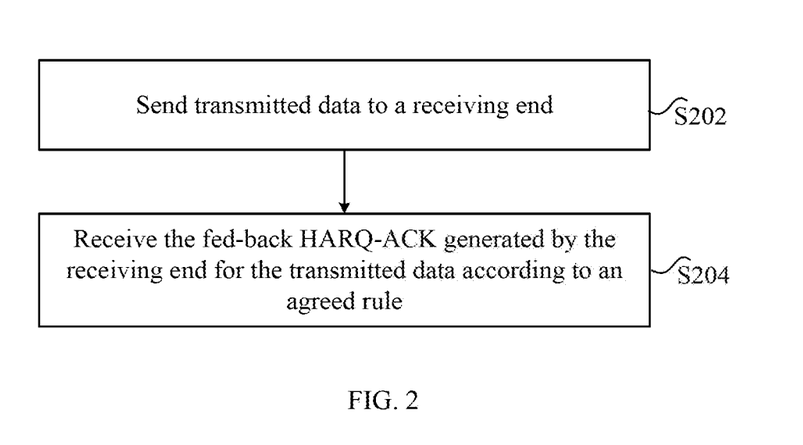
FIG. 2 is a flowchart of a data sending method according to embodiments of the present disclosure.

The present embodiment provides a data sending method. FIG. 2 is a flowchart of a data sending method according to embodiments of the present disclosure. As shown in FIG. 2, the method includes the steps described below.

In step S202, transmitted data is sent to a receiving end.

In step S204, fed-back HARQ-ACK formed by a receiving end for the transmitted data according to an agreed rule is received.

In one embodiment, the execution subject of the preceding steps is a receiving end, which may be a base station, a terminal, or the like, but is not limited thereto.

Figure 3:
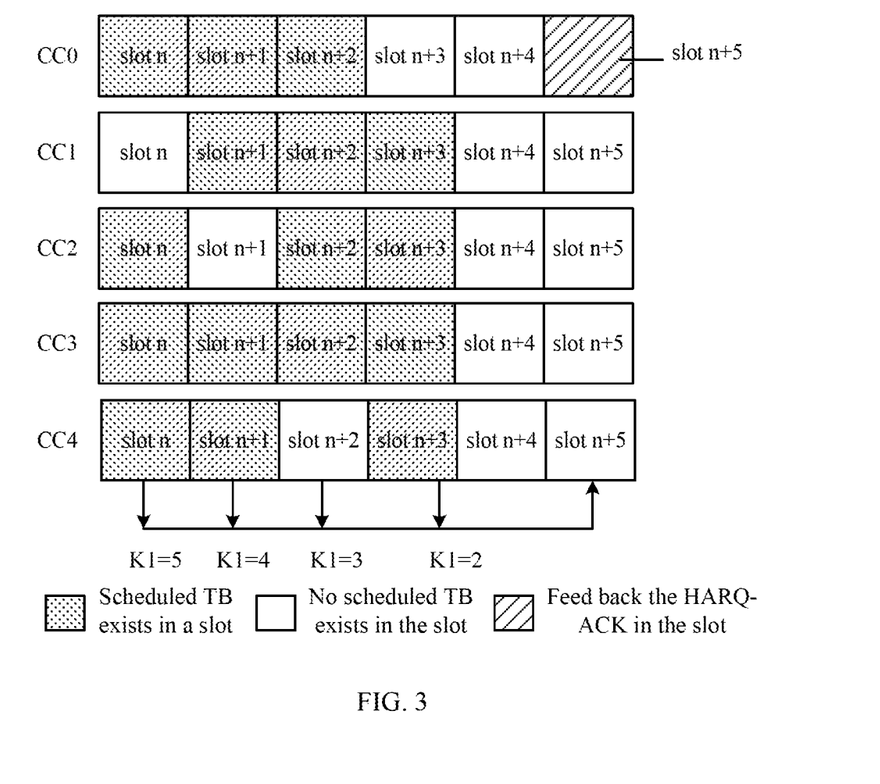
FIG. 3 is a schematic diagram of a carrier slot carrying TB in embodiments of that present disclosure.

In one embodiment, the step of sending transmitted data to the receiving end includes at least one of: sending the transmitted data to the receiving end through different slots of a same carrier; or sending the transmitted data to the receiving end through different carriers that are aggregated. FIG. 3 is a schematic diagram of a carrier slot carrying TB in embodiments of that present disclosure.

In one embodiment, the transmitted data includes a scheduled TB. The scheduled TB includes at least one of: a TB received by a receiving end or a TB that has not been received by the receiving end.

Figure 4:
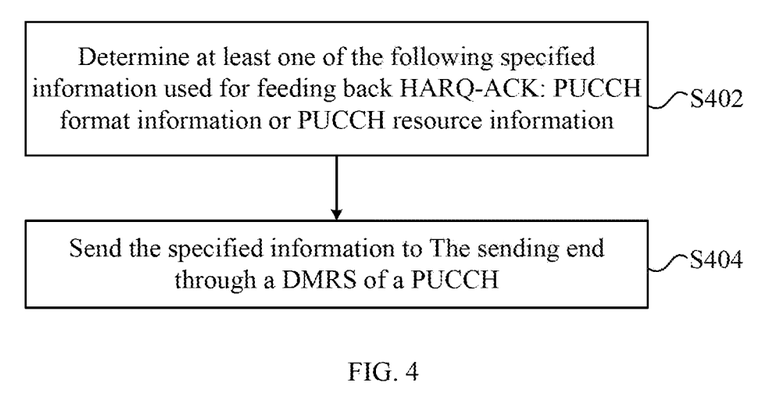
FIG. 4 is a flowchart of another data feedback method according to embodiments of the present disclosure.

The present embodiment provides another data feedback method. FIG. 4 is a flowchart of a data feedback method according to embodiments of the present disclosure. As shown in FIG. 4, the method includes the steps described below.

In step S402, at least one of the following specified information used for feeding back HARQ-ACK is determined: PUCCH format information or PUCCH resource information.

In step S404, a sending end is informed of the specified information through a DMRS of the PUCCH.

In one embodiment, the execution subject in the preceding steps is a receiving end, which may be a base station, a terminal, or the like, but is not limited thereto.

In one embodiment, PUCCH format information includes one of the following: a short format, a long format, a number of symbols of the PUCCH, and a specified format in a format set configured by a sending end.

In one embodiment, PUCCH resource information includes specified PUCCH resource in a PUCCH resource set configured by a sending end.

In one embodiment, PUCCH resource in a PUCCH resource set is bound with at least one of the following: a PUCCH format, a number of OFDM symbols of the PUCCH, a symbol position of the OFDM of the PUCCH, and a slot position corresponding to the PUCCH.

In one embodiment, the steps in which a sending end is informed of specified information through a DMRS of a PUCCH include the steps described below.

The sending end is implicitly informed of the specified information through different symbol positions of the DMRS.

The sending end is implicitly informed of the specified information through different cyclic shifts of DMRS sequences.

The sending end is implicitly informed of the specified information through the different DMRS sequences.

The sending end is implicitly informed of the specified information through a combination of different symbol numbers and symbol positions of the DMRS.

The sending end is implicitly informed of the specified information through a combination of the different cyclic shifts of the DMRS sequences in different symbols of the DMRS.

The sending end is implicitly informed of the specified information through a combination of different sequences in the different symbols of the DMRS.

Figure 5:
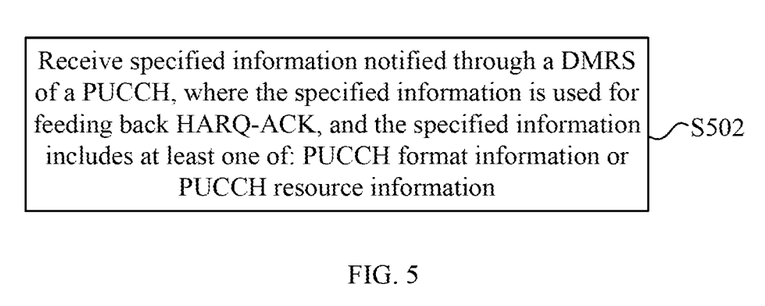
FIG. 5 is a flowchart of a data receiving method according to embodiments of the present disclosure.

The present embodiment provides another data receiving method. FIG. 5 is a flowchart of a data receiving method according to embodiments of the present disclosure. As shown in FIG. 5, the method includes the step described below.

In step S502, specified information of which informed through a DMRS of a PUCCH is received, where the specified information is used for feeding back HARQ-ACK, and the specified information includes at least one of the following: PUCCH format information and PUCCH resource information.

In one embodiment, the execution subject in the preceding steps is a receiving end, which may be a base station, a terminal, or the like, but is not limited thereto.

In one embodiment, the steps in which specified information of which informed through a DMRS of a PUCCH is received include one of the steps described below.

The specified information of which implicitly informed through different symbol positions of the DMRS is received.

The specified information of which implicitly informed through different cyclic shifts of DMRS sequences is received.

The specified information implicitly informed through the different DMRS sequences is received.

The specified information implicitly informed through a combination of different symbol numbers and symbol positions of the DMRS is received.

The specified information implicitly informed through a combination of the different cyclic shifts of the DMRS sequences in different symbols of the DMRS is received.

The specified information implicitly informed through a combination of different sequences in the different symbols of the DMRS is received.

From the description of the above-mentioned embodiments, it will be apparent to those skilled in the art that the method in the embodiments described above may be implemented by software plus a necessary general-purpose hardware platform, or may of course be implemented by hardware. However, in many cases, the former is a preferred implementation manner. Based on this understanding, the technical solutions of the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to perform the methods according to the embodiments of the present disclosure.

Embodiment Two

The present embodiment further provides a data feedback device, a data sending device and a data receiving device, a receiving device and a sending device. The device is configured to implement the above-mentioned embodiments and examples. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceived.

The present embodiment, a data feedback device is provided. The device applied to a base or a terminal includes a generation module, which is configured to generate a HARQ-ACK for transmitted data; and a feedback module, which is configured to feed back the HARQ-ACK to a sending end.

In one embodiment, the generation module includes at least one of: a first generation unit, which is configured to generate a first HARQ-ACK of the TB level for the transmitted data respectively, where each TB corresponds to one bit; a second generation module, which is configured to, for incorrectly decoded TBs in the transmitted data, generate a second HARQ-ACK of the CBG level for each incorrectly decoded TB, where each CBG corresponds to one bit.

In one embodiment, the step in which HARQ-ACK is fed back to a sending end includes the step described below. If the first HARQ-ACK and second HARQ-ACK need to be fed back at the same time, the HARQ-ACKs are fed back to the sending end through one of the following modes: time division multiplexing, frequency division multiplexing and code division multiplexing.

In one embodiment, the step in which for incorrectly decoded TBs in the transmitted data, the second HARQ-ACK of the CBG level is generated for the incorrectly decoded TB includes the step described below. The second HARQ-ACK is sequentially generated for each TB of NACK according to an order of the transmitted data.

In one embodiment, each TB of NACK includes at least one of the following: the TB whose DCI is not detected, and a TB that is supposed to be scheduled by a sending end but has not been sent. For example, it is planed that the sending end schedules 8 TBs, but finally the sending end sends 6 TBs, and at this time, 2 TBs are the TBs which are supposed to be scheduled but have not been sent.

In one embodiment, TBs of transmitted data satisfy at least one of conditions described below.

A number of bits of the second HARQ-ACK of the TBs of NACK in the transmitted data is configured by high-layer signaling or physical-layer signaling.

A number of CBGs of the TBs of the NACK in the transmitted data is configured by high-layer signaling or physical-layer signaling.

A total number of the CBGs for all TBs in the transmitted data or a total number of bits of the second HARQ-ACK for all TBs in the transmitted data are configured by a high layer, and it is agreed that a difference value of the number of the CBGs obtained by each TB or the number of bits of the second HARQ-ACK obtained by each TB is not more than 1.

In one embodiment, the step in which HARQ-ACK is fed back to a sending end includes one of the steps described below.

When all CRCs of transmitted data pass, the HARQ-ACKs only include first HARQ-ACKs and all the HARQ-ACKs are ACKs.

When all CRCs of the CBs in the transmitted data do not pass and all the CRCs of the transmitted data do not pass, the HARQ-ACKs only include first HARQ-ACKs and all the first HARQ-ACKs are NACKs.

When all CRCs of the CBs in the transmitted data do not pass and all the CRCs of the transmitted data do not pass, the HARQ-ACKs only include first HARQ-ACKs and all the first HARQ-ACKs are NACKs.

When all the CRCs of the transmitted data do not pass and not all the CRCs of the CBs in the transmitted data pass or all the CRCs of the CBs in the transmitted data do not pass, the HARQ-ACKs only include second HARQ-ACKs.

In one embodiment, the step in which HARQ-ACKs are fed back to a sending end includes the step described below. First HARQ-ACKs and second HARQ-ACKs are serially connected in a same PUCCH and fed back to the sending end.

In one embodiment, transmitted data satisfies at least one of the following conditions.

The transmitted data comes from different slots of a same carrier.

The transmitted data comes from different carriers that are aggregated.

In one embodiment, the present embodiment further includes one of the steps described below. PUCCH format information and/or PUCCH resource information used for feeding back HARQ-ACK are/is determined, and a sending end is informed of the PUCCH format information and/or PUCCH resource information through a DMRS of the PUCCH. The PUCCH format information and/or the PUCCH resource information are/is obtained from the DCI corresponding to transmitted data, and the PUCCH format information and/or the PUCCH resource information are/is used for feeding back the HARQ-ACK.

In one embodiment, the steps in which a sending end is informed through a DMRS of a PUCCH include the steps described below.

The sending end is implicitly informed through different symbol positions of a DMRS.

The sending end is implicitly informed through different cyclic shifts of DMRS sequences.

The sending end is implicitly informed through the different DMRS sequences.

The sending end is implicitly informed through a combination of different symbol numbers and symbol positions of the DMRS.

The sending end is implicitly informed through a combination of the different cyclic shifts of the DMRS sequences in different symbols of the DMRS.

The sending end is implicitly informed through a combination of different sequences in the different symbols of the DMRS.

In one embodiment, the present embodiment further includes that PUCCH format information and/or PUCCH resource information of which informed by a DMRS are/is used for first HARQ-ACK and/or second HARQ-ACK according a convention with a sending end.

In one embodiment, PUCCH format information includes one of the following: a short format, a long format, a number of symbols of the PUCCH, and a specified format in a format set configured by a sending end.

In one embodiment, PUCCH resource information includes specified PUCCH resource in a PUCCH resource set configured by a sending end.

In one embodiment, PUCCH resource in a PUCCH resource set is bound with at least one of the following: a PUCCH format, a number of OFDM symbols of the PUCCH, a symbol position of the OFDM of the PUCCH, and a slot position corresponding to the PUCCH.

In one embodiment, the step in which HARQ-ACK are fed back to a sending end includes the step described below. First HARQ-ACK and second HARQ-ACK are respectively fed back to the sending end by using adjacent first resource and second resource.

In one embodiment, second resource is reserved according to a number of scheduled TBs and a preset transmission error probability.

In one embodiment, transmitted data includes scheduled a TB. The scheduled TB includes at least one of: a received TB, or a TB that has been sent by the sending end but has not been received.

The present embodiment provides a data sending device. The device is applied to a base or a terminal and includes a sending module, which is configured to send transmitted data to a receiving end; and a receiving module, which is configured to receive fed-back HARQ-ACK formed by the receiving end for the transmitted data according to an agreed rule.

In one embodiment, the sending module includes a first sending unit, which is configured to transmit the transmitted data to the receiving end through different slots of a same carrier; and/or a second sending unit, which is configured to send the transmitted data to the receiving end through different carriers that are aggregated.

The present embodiment provides another data feedback device. The device includes a determination module, which is configured to determine at least one of the following specified information used for feeding back HARQ-ACK: PUCCH format information or PUCCH resource information; and an informing module, which is configured to inform a sending end of the specified information through a DMRS of a PUCCH.

In one embodiment, the step in which the sending end is informed of specified information through a DMRS of a PUCCH by the sending module includes the steps described below.

The sending end is implicitly informed of the specified information through different symbol positions of the DMRS.

The sending end is implicitly informed of the specified information through different cyclic shifts of DMRS sequences.

The sending end is implicitly informed of the specified information through the different DMRS sequences.

The sending end is implicitly informed of the specified information through a combination of different symbol numbers and symbol positions of the DMRS.

The sending end is implicitly informed of the specified information through a combination of the different cyclic shifts of the DMRS sequences in different symbols of the DMRS.

The sending end is implicitly informed of the specified information through a combination of different sequences in the different symbols of the DMRS.

The present embodiment provides a data receiving device. The device includes a receiving module, which is configured to receive specified information of which informed through a DMRS of a PUCCH, where the specified information is used for feeding back HARQ-ACK, and the specified information includes at least one of the following: PUCCH format information or PUCCH resource information.

Optionally, the step in which the receiving module receives the specified information informed through the DMRS of the PUCCH includes one of the steps described below.

The specified information implicitly informed through different symbol positions of the DMRS is received.

The specified information implicitly informed through different cyclic shifts of DMRS sequences is received.

The specified information implicitly informed through the different DMRS sequences is received.

The specified information implicitly informed through a combination of different symbol numbers and symbol positions of the DMRS is received.

The specified information implicitly informed through a combination of the different cyclic shifts of the DMRS sequences in different symbols of the DMRS is received.

The specified information implicitly informed through a combination of different sequences in the different symbols of the DMRS is received.

The present embodiment further provides a terminal, which includes a processor and a memory storing instructions executable by the processor. The instructions, when executed by the processor, cause the processor to perform the operations described below.

HARQ-ACK is generated for transmitted data.

The HARQ-ACK is fed back to a sending end.

In one embodiment, when the instructions are executed to generate HARQ-ACK for transmitted data, the instructions are executed to perform at least one of the operations described below.

A first HARQ-ACK which is the TB level is generated for the transmitted data respectively, where each TB corresponds to one bit.

For incorrectly decoded TBs in the transmitted data, a second HARQ-ACK which is the CBG level is generated for each incorrectly decoded TB, where each CBG corresponds to one bit.

That is, the steps of the method shown in FIG. 1 are performed.

The present embodiment provides another receiving device, which includes a processor and a memory storing instructions executable by the processor. The instructions when executed by the processor, cause the processor to perform the operations described below.

At least one of the following specified information used for feeding back HARQ-ACK is determined: PUCCH format information and PUCCH resource information.

A sending end is informed of the specified information through a DMRS of the PUCCH.

Optionally, when the instruction are executed to send the transmitted data to the receiving end, the instruction are executed to perform one of the operations described below.

The sending end is implicitly informed of the specified information through different symbol positions of the DMRS.

The sending end is implicitly informed of the specified information through different cyclic shifts of DMRS sequences.

The sending end is implicitly informed of the specified information through the different DMRS sequences.

The sending end is implicitly informed of the specified information through a combination of different symbol numbers and symbol positions of the DMRS.

The sending end is implicitly informed of the specified information through a combination of the different cyclic shifts of the DMRS sequences in different symbols of the DMRS.

The sending end is implicitly informed of the specified information through a combination of different sequences in the different symbols of the DMRS.

That is, the steps of the method shown in FIG. 4 are performed.

The present embodiment further provides a data sending device, which includes a processor and a memory storing instructions executable by the processor. The instructions, when executed by the processor, cause the processor to perform the operations described below.

The transmitted data is sent to the receiving end.

The fed-back HARQ-ACK formed by the receiving end for the transmitted data according to an agreed rule is received.

Optionally, when the instruction are executed to send the transmitted data to the receiving end, the instruction are executed to perform one of the operations described below.

The transmitted data is sent to the receiving end through different slots of a same carrier; and/or, the transmitted data is sent to the receiving end through different carriers that are aggregated.

That is, the steps of the method shown in FIG. 2 are performed.

The present embodiment further provides another data sending device, which includes a processor and a memory storing processor-executable instructions which, when executed by the processor, causes the processor to perform the operations described below.

Specified information of which informed through a DMRS of a PUCCH is received, where the specified information is used for feeding back HARQ-ACK, and the specified information includes at least one of the following: PUCCH format information and PUCCH resource information.

Optionally, when the instruction executes sending the transmitted data to a receiving end, it includes performing one of the operations described below.

The specified information implicitly informed through different symbol positions of the DMRS is received.

The specified information implicitly informed through different cyclic shifts of DMRS sequences is received.

The specified information implicitly informed through the different DMRS sequences is received.

The specified information implicitly informed through a combination of different symbol numbers and symbol positions of the DMRS is received.

The specified information implicitly informed through a combination of the different cyclic shifts of the DMRS sequences in different symbols of the DMRS is received.

The specified information implicitly informed through a combination of different sequences in the different symbols of the DMRS is received.

That is, the steps of the method shown in FIG. 5 are performed.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment Three

The present embodiment is an optional embodiment of the present disclosure and used for describing the present application in detail in conjunction with examples.

In the present embodiment, a sending end is a node that sends data and receives HARQ-ACK fed back by a receiving end for data. A receiving end is a node that receives the data and feeds back the HARQ-ACK corresponding to the data. For uplink data, both transmission of downlink data and HARQ-ACK feedback are applicable.

The present embodiment further includes a number of examples.

EXAMPLE ONE

The basic idea of the method is mainly illustrated. For example, the formation of two types of HARQ-ACK is illustrated.

For a receiving end (here, it is assumed that the method may be used for HARQ-ACK feedback of downlink data, and may also be used for uplink data), when it is required that received HARQ-ACKs of multiple TBs are fed back in a PUCCH, it is assumed that the number of bits of CBG HARQ-ACKs fed back by each of the TBs is 10 bits.

It is assumed that in a single carrier, the UE receives TB1, TB2, TB3, TB4 and TB5 in slot n, slot n+1, slot n+2, slot n+3, slot n+4, respectively, and these TBs are required to perform HARQ-ACK feedback in slot n+6. The UE is supposed to decode TB1~TB5, where the decoding conditions of TB1, TB2 and TB4 are correct (CRC checks of TBs pass), the decoding conditions of TB3 and TB5 are incorrect, partial CBGs are correct (CRC checks of all CBs included in the CBGs pass), and partial CBGs are incorrect. At this time, TB HARQ-ACKs formed by the UE are: 11010, 1 indicates ACK (correct reception), and 0 indicates NACK (incorrect reception). CBG HARQ-ACKs are formed for TB3 and TB5 (assuming that in TB3, the 1st CBG and the 2nd CBG are not correctly received, the rest of CBGs are correctly received, and in TB5, the 1st CBG to the 4th CBG are not correctly received, and the rest of CBGs are correctly received): 0011, 1111, 11; 0000, 1111, 11; then, TB3 and TB5 form CBG HARQ-ACKs according to a sequence of the TB HARQ-ACKs, where the CBG HARQ-ACKs are serially connected: 0011, 1111, 1100, 0011, 1111; the total feedback bits at this time are: 11010 (the TB HARQ-ACKs) +0011, 1111, 1100, 0011, 1111 (CBG HARQ-ACKs of TBs corresponding to TB NACK), 25 bits in total. If each of TBs is fed-back CBG HARQ-ACKs, 50 bits are needed. Obviously, this approach does not affect the CBG-based retransmission mechanism, that is, CBGs that are received incorrectly can still be retransmitted.

In practice, the probability of correct transmission of data is 90%, and this way, in this example, a bit saving of 90% is practical. The bit overhead saved in this method is significant.

The sending end receives TB HARQ-ACKs, then TBs of NACKs according to the TB HARQ-ACKs are determined, and then the number of bits of CBG HARQ-ACKs and the bit of CBG HARQ-ACKs of each of the TBs marked as NACKs are determined according to the number and sequence of the TBs marked as NACKs. For example, after the sending end receives the TB HARQ-ACKs, it may find that the 3rd and 5th TBs are marked as NACKs after decoding is performed, and it is further considered that there are CBG HARQ-ACKs corresponding to the 3rd and 5th TBs in the CBG HARQ-ACKs. The sending end then decodes the CBG HARQ-ACKs to obtain the CBG HARQ-ACKs corresponding to the 3rd and 5th TBs. In this way, the sending end thinks that the 1st, 2nd and 4th TBs are correctly received with no need for retransmission, and the 3rd and 5th TBs are not correctly decoded, and the CBGs marked as NACKs need to be retransmitted (actually the CBs in the CBGs marked as NACKs are retransmitted).

This method will not affect the efficiency of CBG-based retransmission, but it can effectively reduce the overhead of HARQ-ACK and also save the transmission power consumption of the receiving end (because the fewer bits are sent, the less power consumption is required).

Additionally, as for the number of bits of the CBG HARQ-ACK fed back by each of the TBs, each of the CBGs corresponds to one bit. Each of the TBs is divided into several CBGs, which can be configured by the sending end through RRC signaling and/or physical-layer signaling, or the sending end can configure a total CBG value for multiple TBs, and then the number of CBGs of different TBs is related to the number of layers used in the TB transmission. For example, the more the layers are, the greater the number of CBGs divided for the TBs from the total CBG value is. It may also be the number of CBGs configured for each of the TBs through high-level RRC signaling.

EXAMPLE TWO

Two types of HARQ-ACKs transmission are mainly illustrated.

Based on example one, a specified transmission method for the various types of HARQ-ACKs formed (TB HARQ-ACKs may be marked as a first type and CBG HARQ-ACKs of TBs marked as NACKs may be marked as a second type for convenience of subsequent description) includes the method described below.

Several types of HARQ-ACKs are serially connected, coded, modulated, and then sent.

The number of bits of the second type of HARQ-ACKs varies according to the number of TBs marked as NACKs each time. Therefore, if the two types of HARQ-ACKs are serially connected, coded, modulated, and then sent, the detection complexity may be increased when the sending end receives the HARQ-ACKs fed back by the receiving end, but a PUCCH is needed for this method. Further, it is considered to combine methods to reduce the detection complexity, such as combining rate matching. Since the transmission HARQ-ACKs resources and the modulation and coding information (MCS) allocated by the sending end to the receiving end are all configured, the receiving end is modulated and coded according to the modulation and coding strategy (MCS) information, and then mapped into the resources through a rate matching mode, so that the sending end does not need blind detection when receiving is performed. In this way, the resources need to be allocated according to the maximum demand, but this way can improve the reliability of the HARQ-ACKs transmission, because the total number of bits of the HARQ-ACKs obtained by the way in example one is reduced at this time, and rate matching actually makes the code rate of the HARQ-ACKs very low and the reliability be greatly increased.

Various types of the HARQ-ACKs are sent in different PUCCHs.

In the NR, uplink control information (UCI) (including the HARQ-ACKs) corresponds to different PUCCH formats according to the number of transmitted bits. In addition, in the NR, different PUCCH transmission modes correspond to the number of symbols used by PUCCHs (PUCCHs are divided into short PUCCH and long PUCCH for convenience). The short PUCCH occupies 1~2 symbols and the number of symbols of the long PUCCH is greater than 4.

Therefore, the PUCCH format in the present disclosure includes two meanings, which are the number of symbols used by PUCCHs and the number of bits to be transmitted. The PUCCH format is illustrated. For the UCI with 1~2 bits, if it is configured with 1 or 2 symbols, a PUCCH format will be used. If it is configured with at least 4 symbols, another PUCCH format will be used. For the case of more than or equal to 3 bits and less than or equal to X bit(s) (the value of X is still under discussion) bits, if it is configured with 1 or 2 symbols, a PUCCH format is used, and if it is configured with at least 4 symbols, another PUCCH format is used. For bits greater than X, another PUCCH format is used if it is configured with at least 4 symbols. For the case of more than or equal to 3 bits and less than or equal to X bit(s), if it is configured with 1 or 2 symbols, another PUCCH format is used; if it is configured with 4 symbols, another PUCCH format is used.

Various types of the HARQ-ACK are sent in different PUCCHs. For example, for the first type, since the total number of TBs is determined (known by the sending end) and the TB HARQ-ACK of one bit corresponds to each of the TBs, the total number of bits of the HARQ-ACK of the first type is determined. Then according to the number of symbols configured by the sending end, the corresponding PUCCH format is determined to be transmitted on the allocated resources. For the second type, the total number of bits varies, and the resources allocated by the sending end are also allocated according to the maximum demand. However, when the receiving end performs an operation of sending, it does not need to be mapped to all resources, the operation of sending is performed according to the configured parameters. The sending end first decodes the HARQ-ACK of the first type, knows the number, the sequence and the position of TBs marked as NACKs, then determines the total number of bits of the HARQ-ACK of the second type according to the TBs marked as the NACKs, and then decodes the HARQ-ACK of the second type.

There are relatively multiple PUCCH formats used by the two types, which can be determined according to the number of bits allocated. For example, the two types respectively correspond to two long PUCCHs and time division or frequency division multiplexing of the two long PUCCHs is allowed; or the two types respectively correspond to two short PUCCHs, and time division or frequency division multiplexing of two long PUCCHs is allowed; or one of the two types corresponds to a long PUCCH and the other one of the two types corresponds to a short PUCCH, and time division multiplexing of the two PUCCHs is allowed.

It is also possible to allocate the same resources for the two types of HARQ-ACK, and in the resources, the PUCCHs corresponding to the two types of HARQ-ACK is multiplexed in frequency division, time division or code division.

The sending end configures a PUCCH resource set for the receiving end. In the configured PUCCH resource set, there are a variety of specified PUCCH resources corresponding to different formats, different symbol numbers and different number of bits. For example, the set includes at least one of the following: a specified PUCCH resource 1 that transmits HARQ-ACK of 1 bit and 1 symbol (including symbol position); a specified PUCCH resource 2 that transmits HARQ-ACK of 1 bit and 2 symbols (including symbol position); a specified PUCCH resource 3 that transmits HARQ-ACK of 2 bits and 1 symbol (including symbol position); a specified PUCCH resource 4 that transmits HARQ-ACK of 2 bits and 2 symbols (including symbol position); a specified PUCCH resource 5 that transmits HARQ-ACK of 3~X (the specified value of X is still under discussion, for example, the value is 11 or 22) bits and N (N is greater than or equal to 4, less than or equal to 14, and there are multiple specified PUCCH resources with different values of N) symbols (including symbol position); a specified PUCCH resource 6 that transmits HARQ-ACK of X bits and N (N is greater than or equal to 4, less than or equal to 14, and there are multiple specified PUCCH resources with different values of N) symbols (including symbol positions). The above situations can also be described in conjunction with frequency domain resources.

The sending end can configure a suitable set for the receiving end. For example, four possible specified PUCCH resources are configured, and then the receiving end can select appropriate specified PUCCH resources from the configured set to transmit the corresponding HARQ-ACK respectively according to the number of bits of the formed HARQ-ACK (also in conjunction with the number of OFDM symbols required by the PUCCH).

The receiving end can also implicitly inform the sending end of the specified PUCCH resource selected by itself through a DMRS of a PUCCH in example four. This comparison is suitable for multiple identical specified PUCCH resources in the set.

One example is the configuration of a PUCCH resource set. This method can be independently applied to the configuration of the PUCCH resource set.

At present, a number of specified PUCCH resources included in PUCCH resources refer to frequency domain resources. To save the overhead, it is suggested to redefine a PUCCH resource set. In the PUCCH resource set, it is also possible to have more attributes (besides the resource attributes of the frequency domain) for a specified PUCCH resource at the same time, for example, attributes such as a PUCCH format, a PUCCH start symbol, PUCCH duration (for example, a symbol number of the PUCCH), a slot where the PUCCH is located, whether frequency hopping exists, sequence or code word information and other attributes are further included. These attributes can be represented as tables or joint codes.

For example, one example is a PUCCH resource set design. Each specified PUCCH resource in the PUCCH resource set includes: physical resource block (PRB) index, a PUCCH start symbol, duration and information of a slot where the PUCCH is located. Then for the PUCCH of 1~2 bits, the sequence or the code word information needs to be added. For PUCCHs with bits greater than 2, the sequence or the code word information does not needs to be added. A PUCCH resource set includes N specified PUCCH resources, and the value of N may be determined according to the demands of the UE. For example, when the UE is static or at low speed, the value of N may be configured to be smaller; if the UE moves at a high speed, a greater value of N can be configured, thus more possible PUCCH resources are provided for the UE. For the PUCCH format, it can be determined according to the number of bits to be fed back and the number of symbols (duration) to allocate the specified PUCCH, because both the base station and the UE know the number of bits to be fed back, so the PUCCH format may be implicit. Whether PUCCH frequency hopping exists is directly and independently configured through high-level signaling.

The specified operation is as follows: the base station configures a PUCCH resource set for the UE, and each specified PUCCH resource in the set has frequency domain resources, a start symbol, duration and a corresponding slot. Typically, four specified PUCCH resources are configured. Then, the PUCCH resources specifically used are indicated by physical-level signaling for each UE feedback from the set. For the PUCCH of 1~2 bits, the base station also configures the sequence or the code word information corresponding to information of 1~2 bits for each specific PUCCH resource. The UE receives the PUCCH resource set configured by the base station, determines the specific PUCCH resource corresponding to this feedback according to the indication signaling of the physical layer, and then performs PUCCH transmission according to the demand of the PUCCH resource.

Another example describes that there is a certain relationship between the PUCCH resources of the preceding TB HARQ-ACK and the PUCCH resources of the preceding CBG HARQ-ACK, so that the sending end and the receiving end can calculate the resources corresponding to the PUCCHs of the CBG HARQ-ACK from the PUCCH resources of the TB HARQ-ACK. This saves signaling for allocating resources for another type of PUCCHs. Considering that the total number of bits of TB HARQ-ACK is determined, the corresponding PUCCH resources are allocated to it, and then the PUCCH resources of another type of HARQ-ACK are calculated according to an agreed rule through its PUCCH resources.

For example, when two types of HARQ-ACK are long PUCCHs, the two types may be configured to share same frequency domain resources. And time domain symbols of the two types are continuous, it can be understood that the two PUCCHs are time division in the same frequency domain resources.

For another example, two types of HARQ-ACK have the same frequency division multiplexing in frequency domain resources. Some physical resource blocks or subcarriers are agreed in the resources to be given to HARQ-ACK of the first type, and then some physical resource blocks or subcarriers are agreed to be given to HARQ-ACK of the second type. The two resources are multiplexed in the frequency domain according to the agreed pattern, or the two types of HARQ-ACK respectively continuously occupy part of the frequency domain resources (in units of PRB or subcarrier) and part of the frequency domain resources of the two types are continuous. The start frequency domain position corresponding to HARQ-ACK of the second type is implicitly obtained through the end position of HARQ-ACK of the first type. The number of frequency domain persistent resources can be determined according to the number of TBs marked as NACKs and the number of CBGs of each of the TBs in the TB HARQ-ACK.

For a specific example, for TB HARQ-ACK with total bits of 10 bits, 5 bits being NACKs, and 5 bits being ACKs, the PUCCH format corresponding to a medium load is used for transmission, and the sending end allocates a PRB (assumed as PRBn) to a receiving end to transmit the PUCCH of TB HARQ-ACK. Then, assuming that each of the TBs has 10 CBGs and each of the CBGs has one HARQ-ACK, so that there are 50 bits for CBG HARQ-ACK. According to the coded modulation scheme configured by the sending end for HARQ-ACK of 50 bits, 4 PRBs are needed to perform transmission (assuming that 4 PRBs are needed), so that according to an agreed rule (for example, PUCCH frequency domains of two types of HARQ-ACK are continuous), the resource of HARQ-ACK of the second type is 4 consecutive PRBs after PRBn. Therefore, the sending end and the receiving end can obtain the resource of HARQ-ACK of the second type according to the first PRBn, thereby saving the signaling for allocating the resources for resources of HARQ-ACK of the second type. Here also, the sum is: and the TB HARQ-ACK and the CBG HARQ-ACK are fed back to a sending end by using the adjacent first resource and second resource.

The second resource is reserved according to a total number of scheduled TBs and a preset transmission error probability. For example, there is another method to allocate resources for PUCCHs of HARQ-ACK of the second type. Considering that the number of its bits is related to the number of the TBs transmitted in error, the statistical probability of one TB transmission error is 10%, so that the corresponding resource size can be proportionally distributed to it according to the total number of the scheduled TBs. For example, 10 TBs are scheduled, one TB may be decoded in error, and thus the CBG HARQ-ACK bit corresponds to one TB, thereby allocating resources for it. The ratio may be conservatively increased. For example, 2 TBs may be decoded in error according to 10 TBs, so that the number of bits of CBG HARQ-ACK corresponds to 2 TBs to allocate resources for it. The allocated resources can adopt the above mode, and an agreed relationship exists between the resources of the TB HARQ-ACK and the resources of the CBG HARQ-ACK, so that the resources of the TB HARQ-ACK only need to be informed, and signaling of resource allocation is reduced.

The resources are reserved according to the number of scheduled TBs and a preset probability.

Embodiment Three

The handling of two types of HARQ-ACK in some special cases is mainly illustrated.

Based on example one, several special cases of decoding the multiple TBs/PDSCHs are illustrated in this example.

In case one, when all CRCs of the TBs pass, only TB HARQ-ACK are transmitted and all the TB HARQ-ACK are ACKs, and CBG HARQ-ACK are not transmitted (which also means that no formation is needed, the same applies hereinafter).

In case two, when all CRCs of the CBs in the TBs pass but all the CRCs of the TBs do not pass, only the TB HARQ-ACK are sent and all the TB HARQ-ACK are NACKs, and the CBG HARQ-ACK are not sent.

In case three, when all the CRCs of the CBs in the TBs do not pass and all the CRCs of the TBs do not pass, only the TB HARQ-ACK are sent and all the TB HARQ-ACK are NACKs, and the CBG HARQ-ACK are not sent.

In case four, when all the CRCs of the TBs do not pass and not all the CRCs of the CBs in the TBs pass or all the CRCs of the CBs in the TBs do not pass, only the CBG HARQ-ACK are sent and the TB HARQ-ACK are not sent.

Embodiment Four

Based on the preceding examples, the present examples describe that the receiving end informs the sending end through the DMRS, and the receiving end transmits format information and/or specific PUCCH resource information used by the PUCCH.

The main purpose of this method is that the receiving end determines the number of bits of fed-back HARQ-ACK according to the actual decoding situation, and then a specific PUCCH format is transmitted in the allocated resources after the specific PUCCH format is determined.

The allocated resources can also be a resource set from a PUCCH configured by the sending end, and the UE selects the specific PUCCH resource from the set. However, if the receiving end does not inform the sending end of the PUCCH format and/or specific PUCCH resources independently selected by the receiving end, the sending end needs to blindly detect various possibilities, thus increasing the complexity. Therefore, in this example, it is considered that by using the relevant information of the DMRS of the PUCCH, the sending end is implicitly informed of the PUCCH format and/or specific PUCCH resources used by the receiving end. Because the sending end needs to decode the DMRS before decoding the PUCCH, it is convenient to implicitly inform the sending end by using the relevant information of the DMRS of the PUCCH without increasing the overhead. It is also considered that it is relatively easy for the sending end to detect the DMRS-related information.

For example, the PUCCH format information used by the receiving end may be the information of which implicitly informed by the DMRS, where the PUCCH format information includes at least one of the following: a short format, a long format, a symbol number of the PUCCH, and a symbol position of the PUCCH. The PUCCH format information may also be a different PUCCH format in the PUCCH resource set configured by the sending end for the receiving end or a PUCCH format set configured by the sending end for the receiving end, indicating which format is specifically used.

For example, the specific PUCCH resource information of the PUCCH used by the receiving end may be the information of which implicitly informed by the DMRS, which means that the sending end configures the PUCCH resource set for the receiving end, including multiple specific PUCCH resources. The receiving end implicitly informs the receiving end through the DMRS which specific PUCCH resource is specifically used.

For example, for the definition of a PUCCH resource set, the PUCCH resources in the set are bound to at least one of the PUCCH format, the symbol number of the PUCCH, and the symbol position of the PUCCH (the position in the slot). For example, the specific PUCCH resources in the set correspondingly have their own PUCCH formats. The specific PUCCH resources in the set correspondingly have their own symbol numbers and symbol positions of the PUCCH. Different specific PUCCH resources in the set correspondingly have their own PUCCH formats, symbol numbers and symbol positions. It can also be understood that a PUCCH resource in the set correspondingly has its own transmission mode. When the receiving end selects or configures a specific PUCCH resource, the corresponding coding and modulation mode, coincidence number and symbol position are all determined correspondingly.

For example, implicit notification through the DMRS specifically includes at least one of the modes described below.

1) Implicit notification of the used PUCCH format and/or specific PUCCH resource information through different symbol positions of the DMRS is performed. For example, different PUCCH formats or different specific PUCCH resources have different symbol positions of the DMRS.

2) Implicit notification of the used PUCCH format and/or specific PUCCH resource information through different cyclic shifts of DMRS sequences is performed. For example, in different PUCCH formats or different specific PUCCH resources, corresponding DMRSs have different cyclic shifts.

3) Implicit notification of the used PUCCH format and/or specific PUCCH resource information through the different DMRS sequences is performed. For example, in different PUCCH formats or different specific PUCCH resources, corresponding DMRSs have different sequences.

4) Implicit notification of the used PUCCH format and/or specific PUCCH resource information through a combination of different symbol numbers and symbol positions of the DMRS is performed. For example, in different PUCCH formats or different specific PUCCH resources, corresponding symbols of the DMRS have different positions and numbers.

5) Implicit notification of the used PUCCH format and/or specific PUCCH resource information through a combination of the different cyclic shifts of the DMRS sequences in different symbols of the DMRS is performed. For example, in different PUCCH formats or different specific PUCCH resources, corresponding DMRSs in the different symbols of the DMRS have different cyclic shifts.

6) Implicit notification of the used PUCCH format and/or specific PUCCH resource information through a combination of different sequences in the different symbols of the DMRS is performed. For example, in different PUCCH formats or different specific PUCCH resources, corresponding DMRSs in the different symbols of the DMRS have different sequences.

Embodiment Five

On the basis of examples 1, 2, 3 and 4, a HARQ-ACK of 1 bit formed for multiple TBs is added as follows.

At the receiving end, when all of the TBs are correctly decoded, an ACK of 1 bit is fed back (this is regarded as a HARQ-ACK of the third type), TB HARQ-ACK of all of the TBs (actually ACKs of 10 bit) and CBG HARQ-ACK of the TBs marked as NACKs (in this case, CBG HAR-ACKs is not actually formed) are no longer sent. The probability of this kind of situation is still high, because the statistical probability of correct transmission of a data block is 90%. In this way, when ACK information of 1 bit is sent, the methods in the preceding embodiments may be adopted, such as the method of determining resources, the method of determining formats and other methods. For example, a specific PUCCH resource in the PUCCH resource set configured by the sending end for the receiving end corresponds to a HARQ-ACK format of 1 bit. The sending end receives feedback of the receiving end from this specific PUCCH resource in the PUCCH resource set. If decoded as ACK, the sending thinks that all of the TBs have been correctly received by the receiving end.

At the receiving end, when all of the TBs are not correctly decoded, an NACK (this is regarded as a HARQ-ACK of the third type) of one bit is fed back. TB HARQ-ACK of all of the TBs are not sent, and CBG HARQ-ACK of the TBs marked as NACKs (actually all of the TBs) are sent. The probability of this kind of situation is very low, because the transmission of the transmission data channel introduces various guarantee mechanisms, so the statistical probability of transmission reliability is 90%. In this way, when NACK information of 1 bit is sent, the methods in the preceding embodiments may be adopted, such as the method of determining resources, the method of determining formats and other methods. For example, a specific PUCCH resource in the PUCCH resource set configured by the sending end for the receiving end corresponds to a HARQ-ACK format of 1 bit. The sending end receives feedback of the receiving end from this specific PUCCH resource in the PUCCH resource set. If decoded as NACK, the sending end thinks that all of the TBs are not correctly received by the receiving end, and then CBG HARQ-ACK are received from another specific PUCCH resource (here, it is assumed that in the PUCCH resource, there is another specific PUCCH resource corresponding to the HARQ-ACK format that transmits more bits). After correct decoding is performed, retransmission of erroneous CBGs of each of the TBs is performed.

For CBG-based feedback, when multiple HARQ-ACK of TBs/PDSCHs are multiplexed in one slot, adopting the present embodiment can reduce the number of bits of HARQ-ACK, thereby reducing the overhead and saving transmission power consumption at the receiving end without affecting CBG retransmission performance.

Embodiment Four

Embodiments of the present disclosure further provide a storage medium. Optionally, in the present embodiment, the storage medium may be configured to store program codes for performing the steps described below.

In step S1, HARQ-ACK is generated for transmitted data.

In step S2, the HARQ-ACK is fed back to a sending end.

Optionally, in the present embodiment, the storage medium may include, but is not limited to, a USB flash disk, a read-only memory (ROM), a random access memory (RAM), a mobile hard disk, a magnetic disk, an optical disk or another medium capable of storing program codes. Optionally, in the present embodiment, a processor executes, according to the program codes stored in the storage medium, the step in which the HARQ-ACK is generated for the transmitted data.

Optionally, in the present embodiment, a processor executes, according to the program codes stored in the storage medium, the step in which the HARQ-ACK is fed back to the sending end.

Optionally, for specific examples in this embodiment, reference may be made to the examples described in the preceding embodiments and specific embodiments, and repetition will not be made in the present embodiment.

Apparently, it should be understood by those skilled in the art that each of the modules or steps of the present disclosure described above may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

What is claimed is:

1. A data feedback method, comprising:
generating a hybrid automatic repeat request acknowledgement (HARQ-ACK) for transmitted data; and
feeding back the HARQ-ACK to a sending end;
wherein generating the HARQ-ACK for the transmitted data comprises at least one of:
generating a first HARQ-ACK of a transport block (TB) level for each TB in the transmitted data, wherein each TB corresponds to one HARQ-ACK bit; or
generating a second HARQ-ACK of a code block group (CBG) level for each incorrectly decoded TB in the transmitted data, wherein each CBG corresponds to one HARQ-ACK bit; and
wherein generating the second HARQ-ACK of the CBG level for each incorrectly decoded TB in the transmitted data comprises:
according to an order of TB in the transmitted data, sequentially generating the second HARQ-ACK for each TB of the negative acknowledgement (NACK).

2. The method of claim 1, wherein feeding back the HARQ-ACK to the sending end comprises:
if the first HARQ-ACK and the second HARQ-ACK need to be fed back at the same time, feeding back the HARQ-ACK to the sending end through one of the following modes:
time division multiplexing, frequency division multiplexing or code division multiplexing.

3. The method of claim 1, wherein the TB of the NACK comprises at least one of: a TB whose downlink control information (DCI) is not detected, or a TB which is supposed to be transmitted by the sending end but has not been sent.

4. The method of claim 1, wherein the TB of the transmitted data satisfies at least one of the following conditions:
a number of bits of the second HARQ-ACK of the TB of NACK for the TB in the transmitted data is configured by high-level signaling or physical-level signaling;
a number of the CBGs of the TB of the NACK for the TB in the transmitted data is configured by high-layer signaling or physical-layer signaling; or
a total number of the CBGs for all TBs in the transmitted data or a total number of bits of the second HARQ-ACK for all TBs in the transmitted data is configured by a high layer, and a difference value of the number of the CBGs obtained by each TB or the number of bits of the second HARQ-ACK obtained by each TB is not greater than 1.

5. The method of claim 1, wherein feeding back the HARQ-ACK to the sending end comprises one of:

in response to cyclic redundancy checks (CRCs) of all the
TBs in the transmitted data passing, the HARQ-ACKs
only comprise the first HARQ-ACKs and all the first
HARQ-ACKs are positive acknowledgements (ACKs);
in response to CRCs of all code blocks (CBs) in all the
TBs in the transmitted data passing and the CRCs of all
the TBs in the transmitted data not passing, the HARQ-
ACKs only comprise the first HARQ-ACKs and all the
first HARQ-ACKs are NACKs;
in response to the CRCs of all the CBs in all the TBs in
the transmitted data not passing and the CRCs of all the
TBs in the transmitted data not passing, the HARQ-
ACKs only comprise the first HARQ-ACKs and all the
first HARQ-ACKs are the NACKs; and
in response to the CRCs of all the TBs in the transmitted
data not passing and not the CRCs of all CBs in all the
TBs in the transmitted data passing or the CRCs of all
CBs in all the TBs in the transmitted data not passing,
the HARQ-ACKs only comprise the second HARQ-
ACKs.

6. The method of claim 1, wherein feeding back the HARQ-ACK to the sending end comprises:
connecting the first HARQ-ACK and the second HARQ-ACK and feeding back the HARQ-ACK obtained through concatenation to the sending end in a PUCCH.

7. The method of claim 1, wherein feeding back the HARQ-ACK to the sending end comprises:
respectively feeding back the first HARQ-ACK and the second HARQ-ACK to a sending end by using adjacent first resource and second resource.

8. The method of claim 1, wherein the transmitted data comprises: a scheduled TB, wherein the scheduled TB comprises at least one of: a received TB, or a TB that has been sent by the sending end has sent but has not been received.

9. A data sending method, comprising:
sending transmitted data to a receiving end; and
receiving a fed back hybrid automatic repeat request
acknowledgement (HARQ-ACK) which is formed by
the receiving end for the transmitted data according to
an agreed rule;
wherein the receiving end generates the HARQ-ACK for
the transmitted data in at least one of the following
manners:
generating a first HARQ-ACK of a transport block (TB)
level for each TB in the transmitted data respectively,
wherein each TB corresponds to one HARQ-ACK bit;
or
generating a second HARQ-ACK of a code block group
(CBG) level for each incorrectly decoded TB in the
transmitted data, wherein each CBG corresponds to one
HARQ-ACK bit and
wherein generating the second HARQ-ACK of the CBG
level for each incorrectly decoded TB in the transmitted
data comprises:
according to an order of TB in the transmitted data,
sequentially generating the second HARQ-ACK for
each TB of the negative acknowledgement (NACK).

10. The method of claim 9, wherein the transmitted data comprises: a scheduled TB, wherein the scheduled TB comprises at least one of: a TB that has been received by the received end or a TB that has not been received by the receiving end.

11. The data sending method of claim 9, wherein receiving the fed HARQ-ACK comprises one of:
if the first HARQ-ACK and the second HARQ-ACK need to be fed back at the same time, the sending end receives the HARQ-ACK through one of the following modes: time division multiplexing, frequency division multiplexing or code division multiplexing.

12. The data sending method of claim 9, wherein the TB of the NACK comprises at least one of: a TB whose downlink control information (DCI) is not detected, or a TB which is supposed to be transmitted by the sending end but has not been sent.

13. The data sending method of claim 9, wherein the TB of the transmitted data satisfies at least one of the following conditions:
a number of bits of the second HARQ-ACK of the TB of NACK for the TB in the transmitted data is configured by high-level signaling or physical-level signaling;
a number of the CBGs of the TB of the NACK for the TB in the transmitted data is configured by high-layer signaling or physical-layer signaling; or
a total number of the CBGs for all TBs in the transmitted data or a total number of bits of the second HARQ-ACK for all TBs in the transmitted data is configured by a high layer, and a difference value of the number of the CBGs obtained by each TB or the number of bits of the second HARQ-ACK obtained by each TB is not greater than 1.

14. The data sending method of claim 9, wherein receiving the HARQ-ACK comprises one of:
in response to cyclic redundancy checks (CRCs) of all the TBs in the transmitted data passing, the HARQ-ACKs only comprise the first HARQ-ACKs and all the first HARQ-ACKs are positive acknowledgements (ACKs);
in response to CRCs of all code blocks (CBs) in all TBs in the transmitted data passing and the CRCs of all TBs in the transmitted data not passing, the HARQ-ACKs only comprise the first HARQ-ACKs and all the first HARQ-ACKs are NACKs;
in response to the CRCs of all CBs in all TBs in the transmitted data not passing and the CRCs of all TBs in the transmitted data not passing, the HARQ-ACKs only comprise the first HARQ-ACKs and all the first HARQ-ACKs are the NACKs; and
in response to the CRCs of all TBs in the transmitted data not passing and not the CRCs of all CBs in all TBs in the transmitted data passing or the CRCs of all CBs in all TBs in the transmitted data not passing, the HARQ-ACKs only comprise the second HARQ-ACKs.

15. The data sending method of claim 9, wherein receiving the HARQ-ACK comprises:
respectively receiving the first HARQ-ACK and the second HARQ-ACK by using adjacent first resource and second resource.

16. The data sending method of claim 9, wherein the receiving end feeds back the HARQ-ACK to the sending end comprises:
connecting the first HARQ-ACK and the second HARQ-ACK and feeding back the HARQ-ACK obtained through concatenation to the sending end in a PUCCH.

17. A data feedback device, comprising:
a processor; and
a memory connected to the processor for storing instructions executable by the processor,
wherein execution of the instructions by the processor causes the processor to perform a data feedback method,
wherein the data feedback method comprises:
generating a hybrid automatic repeat request acknowledgement (HARQ-ACK) for transmitted data; and
feeding back the HARQ-ACK to a sending end;

wherein generating the HARQ-ACK for the transmitted data comprises at least one of:

generating a first HARQ-ACK of a transport block (TB) level for each TB in the transmitted data, wherein each TB corresponds to one HARQ-ACK bit; or generating a second HARQ-ACK of a code block group (CBG) level for each incorrectly decoded TB in the transmitted data, wherein each CBG corresponds to one HARQ-ACK bit and wherein generating the second HARQ-ACK of the CBG level for each incorrectly decoded TB in the transmitted data comprises:

according to an order of TB in the transmitted data, sequentially generating the second HARQ-ACK for each TB of the negative acknowledgement (NACK).

18. A data sending device, comprising:

a processor; and a memory connected to the processor for storing instructions executable by the processor, wherein execution of the instructions by the processor causes the processor to perform the data sending method of claim 9.

\* \* \* \* \*